US011819165B2

(12) United States Patent
Barrie

(10) Patent No.: US 11,819,165 B2
(45) Date of Patent: Nov. 21, 2023

(54) DRINKS BOTTLE

(71) Applicant: VSL Limited, Inverness (GB)

(72) Inventor: Jack Sinclair Barrie, Inverness (GB)

(73) Assignee: VSL Limited, Inverness (GB)

( * ) Notice: Subject to any disclaimer, the term of this patent is extended or adjusted under 35 U.S.C. 154(b) by 290 days.

(21) Appl. No.: 17/076,291

(22) Filed: Oct. 21, 2020

(65) Prior Publication Data

US 2021/0113024 A1    Apr. 22, 2021

(30) Foreign Application Priority Data

Oct. 22, 2019 (GB) ..................................... 1915237

(51) Int. Cl.
 A47J 43/00    (2006.01)
 A47J 43/10    (2006.01)
 A47J 43/27    (2006.01)
(52) U.S. Cl.
 CPC ........... *A47J 43/1018* (2013.01); *A47J 43/27* (2013.01)
(58) Field of Classification Search
 CPC ..... A47J 43/1018; A47J 43/1031; A47J 43/27
 See application file for complete search history.

(56) References Cited

U.S. PATENT DOCUMENTS 1,060,419 A    4/1913  Benjamin
2,181,612 A    5/1939  Smith
(Continued)

FOREIGN PATENT DOCUMENTS

CA    1065846 A    11/1979
CA    2742236 A1    5/2010
(Continued)

OTHER PUBLICATIONS

"Best Shaker Cups & Shaker Bottles"; https://www.blenderbottle.com/; retrieved on Oct. 20, 2020.
(Continued)

*Primary Examiner* — Anshu Bhatia
(74) *Attorney, Agent, or Firm* — Plumsea Law Group, LLC

(57) ABSTRACT

The invention relates to drinks bottles, a method of manufacturing a drinks bottle, a method of mixing drinks using a drinks bottle, and to a mixing component such as a frame or a mixing element for a drinks bottle, and a kit for a drinks bottle. The invention relates to a drinks bottle (10) comprising: a main body (2) for containing liquid, the main body (2) having at least one side wall (4) terminating at a proximal end in an upper edge (16) defining an opening (8), an inner surface of the side wall comprising a first screw thread (5) extending along the side wall (4) away from the upper edge (6) towards a distal end of the main body (2); a removable lid (12) closing the opening (8), the removable lid (12) comprising: a base portion (14) removably located at the upper edge (16) of the main body (2); a handle portion (16) rotatable with respect to the base portion (14); at least one rod (18) mounted on the handle portion (16) axially moveable (e.g. slidably) with respect to the handle portion (16) and rotatable with the handle portion (16); depending from a distal end of the at least one rod (18), a frame (20) having a side wall, another surface of the side wall comprising a second screw thread (25) for engaging with the first screw thread (5) on the inner surface of the side wall of the main body (2); a mixing element (22) mounted on (e.g. located on and/or within) the frame (20); whereby, in use, rotating the handle portion (16) with respect to the base portion (14) rotates the at least one rod (18) and frame (20), engaging the first and second screw threads (5, 25), and causing the at (Continued)

least one rod (18), frame (20) and mixing structure (22) to travel within main body (2) towards a distal end of main body (2) (and vice versa).

23 Claims, 6 Drawing Sheets

(56) References Cited

U.S. PATENT DOCUMENTS

| | | | |
|---|---|---|---|
| 3,704,864 A | 12/1972 | Lee | |
| 4,818,114 A | 4/1989 | Ghavi | |
| 4,872,764 A * | 10/1989 | McClean | A47J 43/27 366/280 |
| 5,911,504 A | 6/1999 | Schindlegger, Jr. | |
| 6,095,676 A * | 8/2000 | Kuan | B01F 33/5011 366/256 |
| 2003/0179647 A1 | 9/2003 | Simba | |
| 2004/0047231 A1 | 3/2004 | Coll | |
| 2006/0255035 A1 | 11/2006 | Lin | |
| 2008/0259723 A1 | 10/2008 | Rhodes et al. | |
| 2008/0277424 A1 | 11/2008 | Larimer et al. | |
| 2010/0065566 A1 | 3/2010 | Bacon et al. | |
| 2011/0003366 A1 * | 1/2011 | Zeikus | C12M 41/12 435/243 |
| 2013/0010568 A1 | 1/2013 | Bodum | |
| 2013/0279287 A1 | 10/2013 | Cerasani | |
| 2014/0269152 A1 | 9/2014 | Venot et al. | |
| 2015/0034748 A1 | 2/2015 | Ortiz | |
| 2015/0283037 A1 | 10/2015 | Trejo | |
| 2017/0065943 A1 | 3/2017 | Dayton | |

FOREIGN PATENT DOCUMENTS

| | | |
|---|---|---|
| DE | 102004054427 A1 | 5/2006 |
| GB | 2512037 A | 9/2014 |
| GB | 2521895 A | 7/2015 |
| GB | 2546902 A | 8/2017 |
| KR | 20180026436 A | 3/2018 |
| WO | 9707724 A1 | 3/1990 |
| WO | 2015135664 | 9/2015 |
| WO | 2016027052 A1 | 2/2016 |

OTHER PUBLICATIONS

"Alpha Bottle 750ml—blue"; https://www.bodyandfit.com/en-gb/Products/Accessories/Sport-Accessories/Shaker-Cups/Alpha-Bottle-750ml--Blue/p/C100098; retrieved Oct. 20, 2020.
"Original2Go ONE Deep Rose"; https://smartshake.com/collections/original-shakers/products/original2go-one-deep-rose; retrieved Oct. 20, 2020.

* cited by examiner

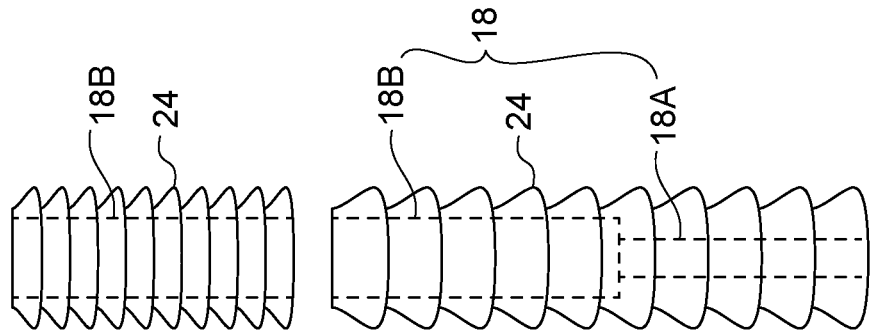
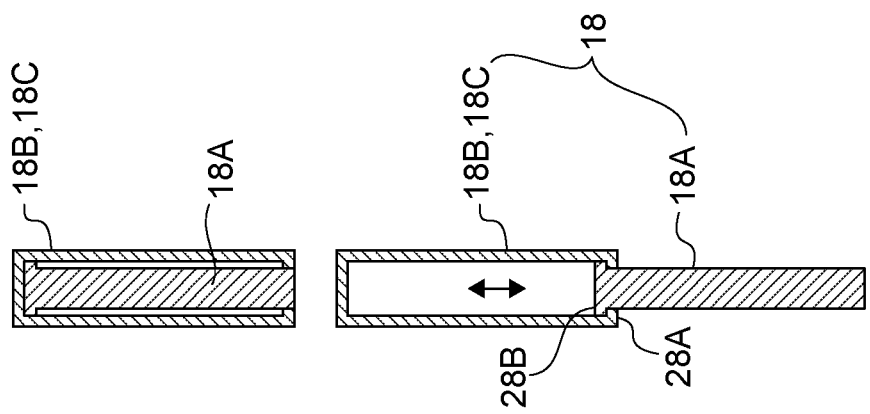
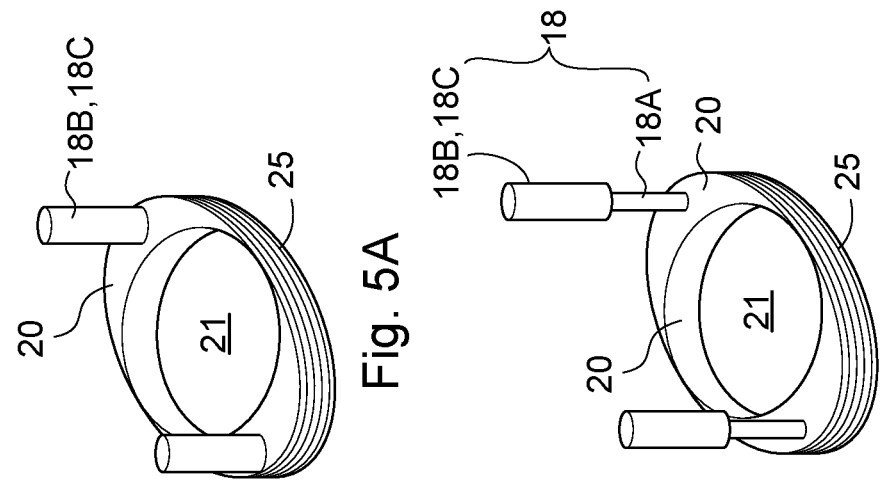
Fig. 5A Fig. 5B Fig. 6A Fig. 6B

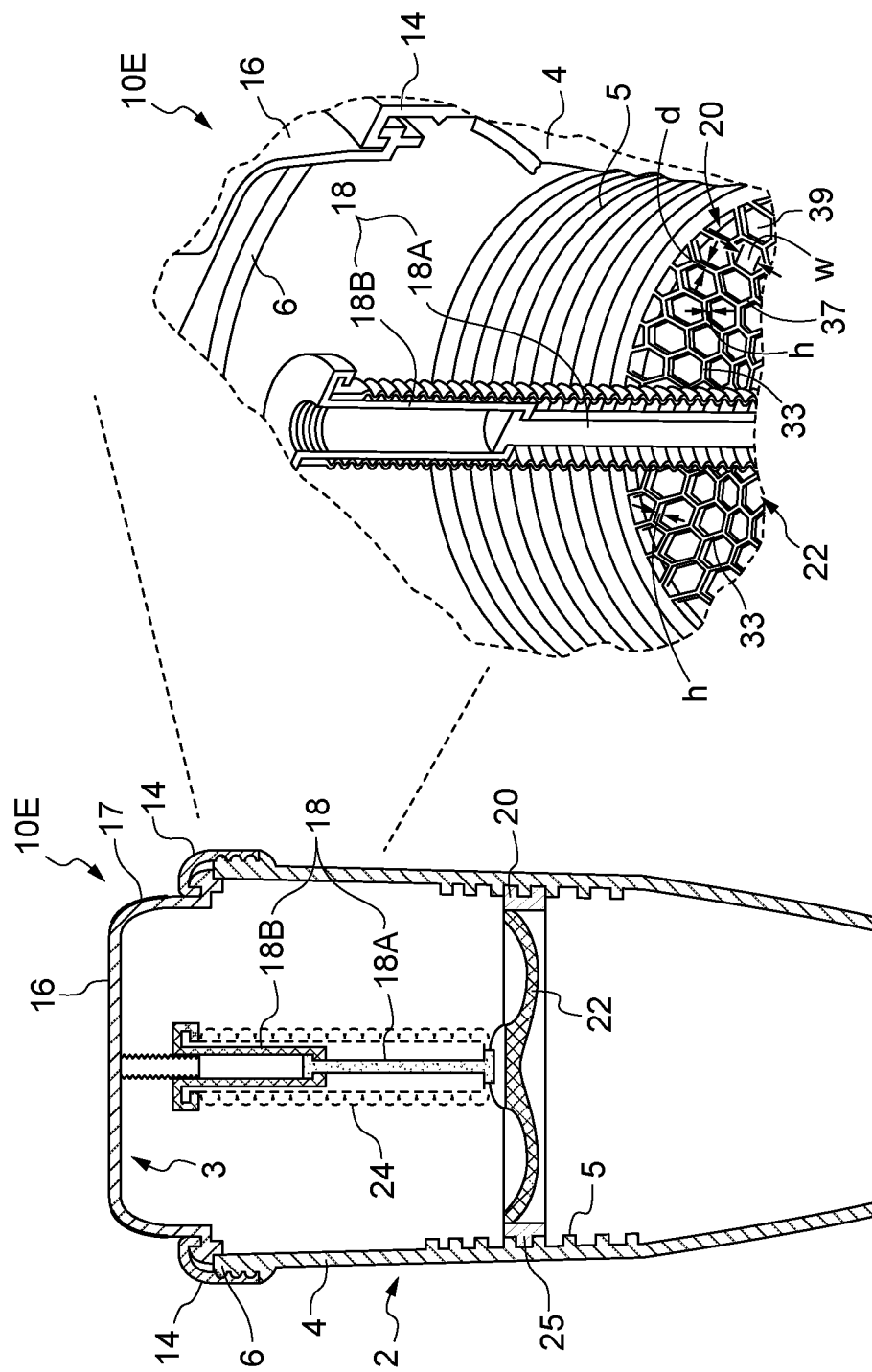

DRINKS BOTTLE

CROSS-REFERENCE TO RELATED APPLICATION(S)

This application claims the benefit of Great Britain Patent Application GB1915237.0, filed Oct. 22, 2019, which is hereby incorporated by reference in its entirety. Great Britain Patent Application No. GB2016675.7, filed on Oct. 21, 2020, also claims priority to Great Britain Patent Application GB1915237.0, and is hereby incorporated by reference in its entirety.

FIELD OF THE INVENTION

The invention relates to drinks bottles, a method of manufacturing a drinks bottle, a method of mixing drinks using a drinks bottle, and to a mixing component such as a frame or a mixing element for a drinks bottle, and a kit for a drinks bottle.

BACKGROUND

Reusable drinks bottles are well known for drinks with one or two similar ingredients such as water and diluting juice, and also for multiple ingredients of different kinds, e.g. ice and fruit juice, or nutritional powder(s) and water. Drinks bottles for sports drinks, nutritionals drinks, slimming drinks, cocktail drinks and the like in particular are well known. Some, drinks use multiple different ingredients that are brought together, e.g. powders such as protein powder, milk powder, other nutritious or flavourful powders etc. together with liquids such as water and/or other ingredients such as fruit juice, fruit pulp and even ice. These can be especially problematic to mix, especially when the mixing vessel is a bottle also to be used as a drinking vessel. Nevertheless, bottles which combine the ability to mix drinks within, and also be used as drinking vessels, are popular.

There can be problems in evenly mixing ingredients within such a drinks bottle to provide a smoothly mixed drink. There can be problems in doing so in a hygienic way, and in washing the drinks bottle afterwards, again hygienically. Lumps of powder, or other ingredients, can remain unmixed and unevenly dispersed in the liquid, rendering the drink unappetising at best, and even undrinkable. Indeed, it may be desirable to add air to drinks during mixing or stirring, and/or to generate foam, to render the drink more appealing. This can be difficult to achieve and can be lost in the transfer from a mixing vessel to a drinking vessel.

Ice or fruit may be initially crushed or pulped before being added to the bottle to aid dispersion within a liquid component. But ice or fruit pulp may require a larger volume than a commensurate amount of liquid, and if a drinks bottle is designed to accommodate this larger volume then this restricts the remaining volume available for mixing apparatus and/or for other types of drinks. This may restrict or prevent the use of that drinks bottle for mixing other types of drinks, which is undesirable.

Using one bottle for different purposes e.g. for mixing and carrying nutritious powders and liquid such as water, and also for mixing and carrying similar ingredients, such as water based ingredients like fruit juice, cocktails and ice, can therefore be problematic. The first requires a specific mixer apparatus to be used within the main volume of the drinks bottle (to mix the dry powder and liquid), whereas the latter may require a more open volume to accommodate the ingredients and/or a specific mixing apparatus in the bottle for the water based ingredients.

Examples of removable mixing apparatus within drinks bottles are known such as the Blender Bottle available from https://www.blenderbottle.com/. Here, a removable spiral of wire shaped into a discrete spherical ball is added to the bottle. The spherical wire ball moves within the internal volume of the bottle when the bottle is agitated. The ball moves within almost the entire volume of the bottle and mixes the ingredients. The ball is of relatively open construction with relatively wide interstitial spacing and can also be removed for easy cleaning of the wire ball, and of the bottle. However, these removable wire balls are very easily lost, and what remains is just a normal drinks bottle with no way of mixing ingredients within it. This is undesirable.

For efficient mixing, especially of nutritious powders and liquid, it is better if the mixing apparatus moves throughout the majority, or most, of the liquid occupied space. Or, conversely, if the mixing apparatus is fixedly positioned within the main volume of the drinks bottle (the main liquid occupying space), it is better if a large portion of all the ingredients being mixed can pass through the mixing apparatus easily. In practice this is difficult to achieve because it is not straightforward to locate a mixing apparatus within a central location of a drinks bottle. For example, holes in the walls of the drinks bottle to attach a mixing apparatus to the correct location may be unhygienic and prone to leaking.

GB2521895—BARRATT describes a drinking vessel with a removable strainer.

US2006255035—LIN describes a protein supplement beverage shaker with a strainer.

U.S. Pat. No. 5,911,504—SCHINDLEGGER describes a stirring device for a beverage container U.S. Pat. No. 4,818,114—GHAVI describes a shaker top for baby bottles, having a removable mixer disc located at the top of the bottle.

US2015283037—TREJO describes a bottle with an internal mixer.

US2003179647—SIMBA describes a drinking vessel with a tilting finger operated vessel stirrer.

GB2546902 and WO2016027052 both to CARRINGTON describe a shaker bottle with separate sections for milk and powder and a mixer mesh ball.

CA1065846—SWARTZ describes a 3D mesh in a bottle.

DE102004054427—LEMAN describes a horizontal mesh across a bottle container.

US2013279287—CERASANI shows a 3 dimensional mixing element extending into a bottle from a lid to facilitate mixing.

US2010065566—BACON describes a collapsible stirrer.

US20150034748—ORTIZ describes a blending container with a strut and lateral blades spun by pulley mechanism and a handle.

CA2742236—ENGHARD describes various lateral structures such as a downwardly depending extendable element (a flat elastic spiral) within a beverage container, to aid mixing.

U.S. Pat. No. 1,060,419—BENJAMIN describes a mixing device comprising an upwardly depending coil spring.

US20080277424—LARIMER describes a flip top shaker with a strainer within the lid that may be pivoted between first and second positions.

US20040047231—COLL describes a mixing device with a grill fixed deep within a container via arms 90 and identifies the problem of locating the mixing device too close to the top of the container.

U.S. Pat. No. 2,181,612—SMITH describes a cocktail shaker with a reciprocating strainer.

U.S. Pat. No. 4,872,764—MCCLEAN describes a cocktail shaker with motor driven blades on a shaft.

WO9707724—OSTERLUND describes a shaker for the preparation of gruel with a mixing part on a shank at a given distance from the neck.

Example of the art include removable mixer balls which can be lost, fixed meshes within the bottles which are hard to clean and can be inefficient at mixing, motor driven mixing elements which are expensive, heavy and hard to clean. The art does not address the problems identified in this application. The present invention seeks to alleviate one or more of the problems of the art.

STATEMENTS OF THE INVENTION

In a first aspect of the invention there is provided a drinks bottle comprising: a main body for containing liquid, the main body having at least one side wall terminating, at a proximal end, in an upper edge defining an opening, an inner surface of the side wall comprising a first screw thread extending along the side wall away from the upper edge towards a distal end of the main body; a removable lid closing the opening, the removable lid comprising: a base portion removably located at the upper edge of the main body; a handle portion rotatable with respect to the base portion; at least one rod mounted on the handle portion rotatable with the handle portion (e.g. rotatable with and by the handle portion), and axially moveable (e.g. slidably) with respect to the handle portion; depending from a distal end of the at least one rod, a frame having a side wall, an outer surface of the side wall comprising a second screw thread for engaging with the first screw thread on the inner surface of the side wall of the main body; a mixing element mounted on (e.g. located on and/or within) the frame; whereby, in use, rotating the handle portion with respect to the base portion rotates the at least one rod and frame, engaging the first and second screw threads, and causing the at least one rod, frame and mixing element to travel within (e.g. axially along) main body towards a distal end of main body (e.g. and vice versa, in other words preferably the deployment of the frame and mixing element is reversible).

In a second aspect of the invention there is provided a method of manufacturing a drinks bottle comprising: providing a drinks bottle as described herein.

In a further aspect of the invention there is provided a method of mixing ingredients, e.g. a liquid and a powder, using a drinks bottle as described herein comprising: adding ingredients e.g. a liquid and a powder, to the main body (optionally, via lid); affixing the base portion of the lid to the upper edge of the main body (optionally after adding the ingredients); rotating the handle portion of the lid with respect to the base portion causing the first and second screw threads to engage, deploying the frame and mixing element into the main body of the drinks bottle; and agitating the drinks bottle thereby mixing the ingredients (e.g. liquid and powder) using the mixing element.

The method may comprise: rotating the handle portion of the lid with respect to the base portion in the opposite direction causing the first and second screw threads to engage in an opposite direction, retracting the frame and mixing element, optionally into lid.

In a further aspect of the invention there is provided a mixing frame for use in a drinks bottle, the drinks bottle having a main body for containing liquid, the main body having at least one side wall terminating, at a proximal end, in an upper edge defining an opening, an inner surface of the side wall comprising a first screw thread extending along the side wall away from the upper edge towards a distal end of the main body, the mixing frame comprising: a side wall having a second screw thread for engaging the first screw thread of the main body; a mixing element located within the frame. Optionally the mixing element is interchangeable (e.g. replaceable) with one or more further mixing elements. The mixing element(s) and frame may comprise interengaging locating elements to facilitate replacement of mixing elements within the frame.

In a further aspect of the invention there is provided a mixing element for use in a mixing frame as described therein or for use in a drinks bottle as described herein, the mixing element locatable within the frame, optionally wherein the mixing element is interchangeable (e.g. replaceable) with one or more further mixing elements.

In a further aspect of the invention there is provided a kit comprising one or more of: a drinks bottle as described herein, and at least one of the following: a mixing frame as described herein, optionally interchangeable; a mixing element, as described herein located within the frame, optionally, wherein the mixing element is interchangeable (e.g. replaceable) with one or more further mixing elements.

In yet a further aspect, there is provided a mixing element comprising a rigid mesh for use in a mixing bottle with or without a mixing frame, the mesh having multiple openings (39), optionally defined by rigid side walls (33), in which at least part of an upper and/or lower edge of an opening, e.g. of at least one side wall of at least one opening, is provided with a sharp edge.

The at least one rod may comprise one or more interlocking element(s) (e.g. vertical rib(s) and/or recess(es)) for cooperating with corresponding one or more interlocking element(s) on the handle portion, facilitating rotational movement of the rod with the handle portion, and axial movement of the rod with respect to the handle portion. This is practical arrangement when a single central rod is provided, but may be used in other embodiments.

Where one rod is provided, this may lie along (e.g. and about) a central longitudinal axis AA' of the bottle. Where two or more rods are provided, these may lie spaced apart from a central longitudinal axis AA'.

The at least one rod may comprise at least two telescoping rod portions with a distal end of a first rod portion fixed to or fixable to, e.g. rigidly, the frame and a proximal end of a second rod portion fixed to, or fixable to, e.g. rigidly, or forming part of, the handle portion of the lid.

In some embodiments, one rod may be provided fixed to, or fixable to, e.g. rigidly, or forming part of, the handle portion, for example, at, or situated in the locale or about, a central location of the handle portion e.g. with respect to a periphery of the handle portion. When centrally located, e.g. so the rod shares a common axis along a central longitudinal axis (AA') of the drinks bottle, this arrangement may facilitate rotation, appearance and/or manufacture.

At least two rods may be provided (preferably spaced apart from a central longitudinal axis AA', preferably equally). The at least two rods may be positioned with their main axes parallel to a central longitudinal axis (AA') of the drinks bottle and/or lie directly opposite one another either side of the central longitudinal axis (AA'). Two, or three or more rods may be provided preferably evenly spaced about, and/or from, a central longitudinal axis (AA') of the drinks bottle. The rods may be equidistant from a central longitudinal axis (AA').

As would be understood by someone skilled in the art from this disclosure, the rod or rods may be one or more of: hollow, solid, partly hollow, partly solid, elongate, straight, angled, smoothly surfaced, roughly surfaced and so on. Indeed, these may comprise multiple rod subsections and/or be of different shapes. For example, these may be U-shaped, C-shaped or Y-shaped and so on. The rod or rods may be of any suitable material and/or structure and/or shape and/or cross-section and/or surface profile as would be understood by someone skilled in the art from this disclosure.

At a distal end, the base portion of the lid may comprise at least one opening for the at least one rod to pass into the main body. The base portion and handle portion of the lid may comprise respective interengaging rotatable surface features to facilitate relative rotational (but preferably not translational) motion therebetween.

The interengaging surface features on each of the base portion and handle portion may comprise one or more of:
a) corresponding protrusion(s) and recess(es);
b) corresponding cylindrical features and recess(es) for receiving same;
c) ball bearings;
d) one or more low friction surface(s).

The handle portion may be located within an external periphery of the base portion in a lateral direction. The handle portion of the lid may extend above and/or below the base portion of the lid in an axial direction. The handle portion and/or the base portion may comprise a recess, or respective recessed portions, for receiving at least a portion of the mixing element and, optionally, the frame, when these are in a retracted position.

The frame may be generally, or substantially, cylindrical. The frame may be removably mounted to the at least one rod e.g. to facilitate interchangeability or replacement of frames.

The second screw thread on the side wall of the frame may comprise at least one of: at least one pitch of the screw thread, more than one pitch of the screw thread, more than one and half pitches of the screw thread, or more than two pitches of the screw thread. The first screw thread may comprise several pitches e.g. two or more or three or even four or more and may extend over a large portion of the inner surface of the side wall of main body. The number, location and axially spread as well as other features of the first (and indeed the second) screw thread(s) may be chosen to provide a desired amount of lateral travel.

The mixing element may be three dimensional (3D) e.g. extending axially as well as laterally with respect to the main body. This may be in the gross form of the mesh e.g. so that it forms a shape such as a pyramid or dome and so on, and/or it may be within the structure of the mixing element e.g. within the mesh structure itself so that the mesh has features such as side walls that extend axially as well as laterally with respect to the main body to form walls that extend at least generally in the axial direction.

The mixing element may comprise, or may be made of, one or more of:
a) one or more removable, and/or replaceable, sub-elements;
b) an open structure to allow liquid and powder to pass through it;
c) relatively stiff construction;
d) rigid construction;
e) mesh comprising multiple openings
f) wire;
g) any suitable material (e.g. plastic, plastic coated metal or metal, etc.).

The mixing element may comprise a rigid mesh with multiple openings defined by rigid side walls. The side walls may form a honeycomb structure e.g. of hexagonal openings. At least part of an upper and/or lower edge of at least one side wall of at least one opening may be provided with a sharp edge (e.g. a sharper profiled edge facing the contents to enhance mixing). This may be a razor-sharp edge or slightly blunted but still having a sufficient cutting edge to enhance breaking up, cutting and mixing of the contents during agitation. In some embodiments, this may be achieved by having a radius of curvature of the cutting edge smaller than the lateral depth 'd' of the side wall.

A mesh comprising multiple openings may be provided and the multiple openings may vary in lateral dimension. The openings may vary in their widest lateral dimension by between ½ and 2 times of the average dimension e.g. for an opening of average lateral width or lateral diameter of 5 mm, other openings of down to around 2-3 mm or up to about 10 mm lateral width or lateral diameter may be provided. This helps in breaking up particles of different sizes whilst allowing flow through the mesh. Some openings may be of the same size or all the openings may be of different sizes. Indeed, all the openings may be of the same size.

The mixing element may be one or more of conical, frustoconical, pyramidal, hemispherical, curved, concatenated in 3 dimensions (e.g. similar to an egg box).

The mixing element may comprise a whimsical shape e.g. mounted to frame (e.g. an animal, a star, a tree and such like). The mixing element may be removably mounted to frame, e.g. to facilitate interchangeability or replacement of mixing elements.

The upper edge of the main body and the base portion of the lid may comprise cooperating screw threads for fixedly locating the lid to the main body in a removable manner. Optionally, a locking mechanism between the main body and the base portion of the lid may also be provided to prevent unscrewing during deployment of the mixing frame.

The at least one rod may comprise an open structure e.g. to facilitate entry and exit of contents of the bottle, for example a cage like structure.

The lid (12) may further comprise one or more of a mouthpiece, a cover, a carry handle (such as a loop or clip-on structure such as carabiner).

Several embodiments of the invention are described and any one or more features of any one or more embodiments may be used in any one or more aspects of the invention as described above.

BRIEF DESCRIPTION OF THE INVENTION

The present invention will now be described, by way of example only, with reference to the following figures. In the figures and following description, the same reference numerals refer to the same, or similar, features.

FIGS. 5A and 5B show a frame and telescoping rods in, respectively, retracted (FIG. 5A) and extended (FIG. 5B) arrangements, for use in the drinks bottle of FIG. 4.

FIGS. 6A and 6B show the telescoping rods of FIGS. 5A and 5B in, respectively, cross sectional elevation and elevation views with, in FIG. 6B, an outer, extendable (e.g. stretchy) protective sleeve.

FIG. 11 shows a cross-sectional elevation view of a drinks bottle 10E in a further example.

FIG. 12 is a close-up perspective cut away view of part of the drinks bottle 10E of FIG. 11.

DETAILED DESCRIPTION OF THE INVENTION

It will be understood by those skilled in the art that any dimensions, and relative orientations, such as lower and higher, inner and outer, above and below, and any directions or locations such as vertical, horizontal, upper, lower, axial, lateral, radial, longitudinal, tangential, central, etc., referred to in this application are within expected structural tolerances and limits for the technical field of this invention, and the apparatus and methods described, and these should be interpreted with this in mind.

Figure 2:
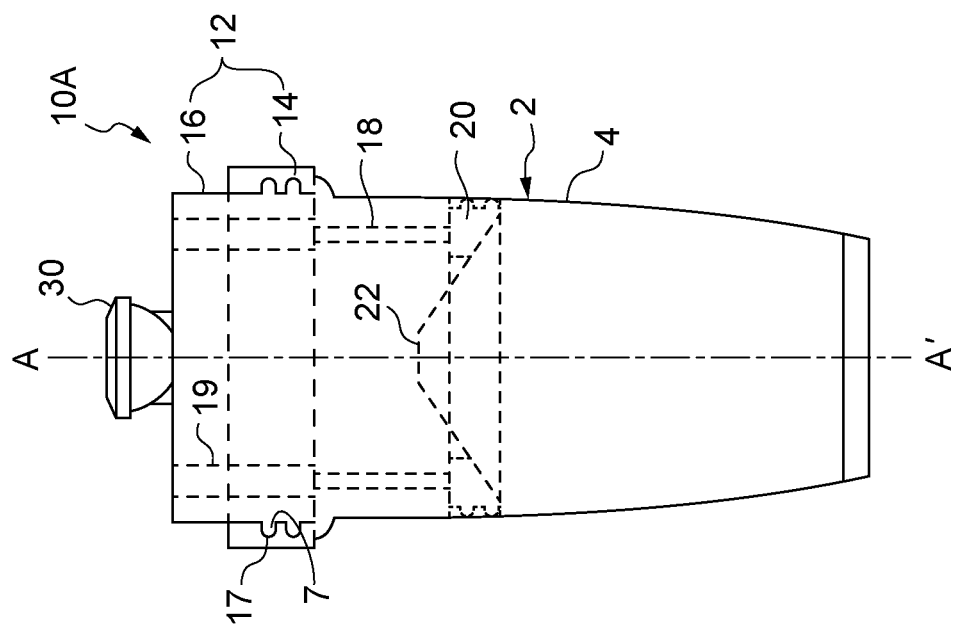
FIG. 2 shows a front elevation view of a drinks bottle 10A comprising the main body of FIG. 1 and a lid in an example embodiment of the invention. Dotted lines are representative of internal features.
Figure 1:
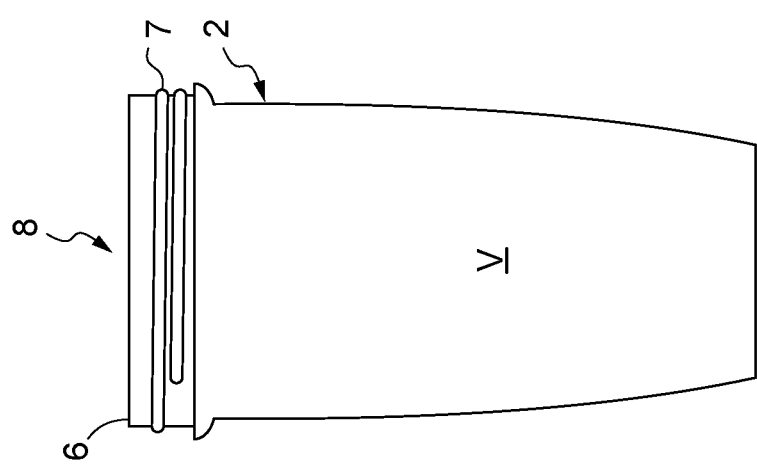
FIG. 1 shows a front elevation view of a main body of a drinks bottle.

Referring to FIGS. 1 and 2, a drinks bottle 10A is shown comprising a main body 2 with an internal volume V for receiving and containing drink ingredients and a removable lid 12 for closing main body 2. Lid 12 may be wholly separable from main body 2, or may remain remotely attached to main body 2 e.g. via a strap, string, wire, chain or other flexible attachment means between lid 12 and main body 2. Main body 2 comprises a side wall 4 which terminates at an upper edge 6 defining a wide central opening 8 leading into internal volume V. Typically, drinks bottles are of generally cylindrical cross section although other shapes are possible. Side wall 4 is, here, of a general cylindrical cross section and upper edge 6 is typically circular. Other shapes are possible. It is preferable that a closure mechanism e.g. in the form of circular screw thread features 7 is provided at or near upper edge 6 for cooperating with corresponding screw thread features 17 on lid 12, whatever the overall cross sectional shape of body 2 or bottle 10A. Thus, here just below upper edge 6, an external screw thread 7 is shown to which lid 12 is removably affixed by cooperating internal screw thread 17 (seen in FIG. 2). Other cooperating closure or fixing means such as snap fit closures, clip mechanisms, and/or strong friction fit may be used.

Lid 12 comprises a base portion 14 removably fixable to main body 2 and a handle portion 16 movable, e.g. rotatable, with respect to base portion 14. A locking mechanism (not shown) may also be provided to prevent temporarily removal of lid 12 and, in particular, base portion 14 from main body 2. Base portion 14 and handle portion 16 may be of any suitable shape. Lid 12 also comprises, in this example embodiment, two spaced apart retractable rods 18 terminating in a frame 20 within which a mixing element, preferably a three dimensional (3D) mixing element 22 is provided, shown here as a conical mesh extending across the frame 20, between internal surface(s) of side wall 4. The mesh may have relatively wide interstitial spacing and/or relatively strong struts or filaments for breaking up and mixing ingredients. The interstitial spacing of the openings as well as the lateral size of the opening themselves within the mesh may vary e.g. from the edges of the mixing element towards the centre. For example, the openings in the mesh may be larger towards the sidewall the main body 2, or vice versa.

Figure 4:
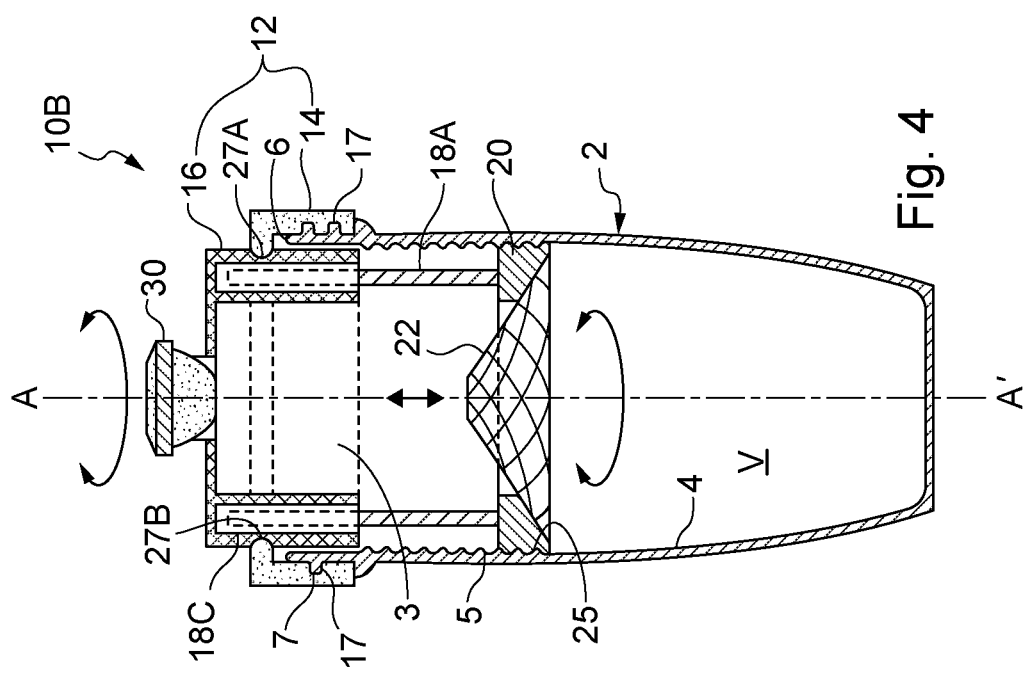
FIG. 4 shows a cross sectional elevation view of a drinks bottle 10B comprising a main body and a lid, in an example embodiment of the invention.
Figure 3:
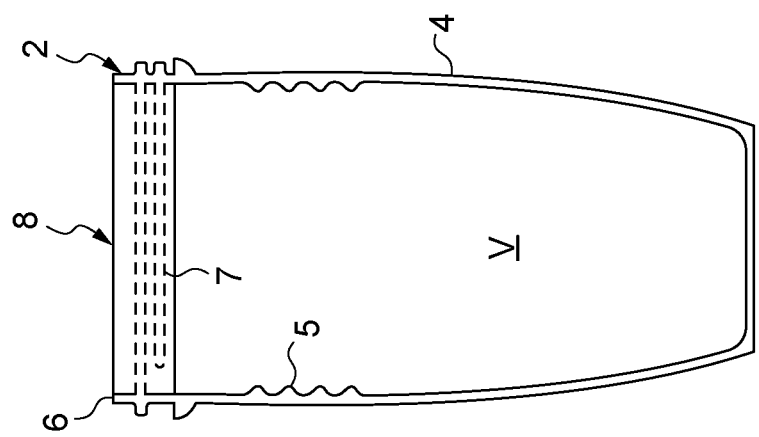
FIG. 3 shows a cross sectional elevation view of a main body of a drinks bottle, similar to that in FIG. 1.

In more detail now, with reference to FIGS. 3 and 4, example arrangements of the internal features of a drinks bottle 10B similar to drinks bottle 10A of FIG. 1 are shown. Main body 2 comprises a side wall 4 with (in FIG. 3) a first screw thread 5 on an inwardly facing surface. First screw thread 5 may extend only part way along the inner surface of side wall 4 (as in FIG. 3), or may extend from proximal opening 8 of at a proximal (here upper) end main body 2 (see FIG. 4) towards a distal end (e.g. the base) of main body 2 (e.g. to half way down the bottle). Indeed, it may extend to a location close to the base of the main body 2. Lid 12 is removably located on main body 2 via cooperating screw thread features 7 and 17 (on main body 2 and lid 12, respectively). Removable lid 12 comprises a rotatable handle portion 16 rotatably mounted on base portion 14. Preferably both base portion 14 and handle portion 16 are generally cylindrical at least about opposing wall(s) thereof, to facilitate relative rotation with respect to one another. There are many ways this rotational (but not translational) motion can be achieved. For example, base portion 14 may comprise a lateral cylindrical projection 27A which locates and travels in a corresponding cylindrical recess 27B of handle portion 16, or vice versa. In addition, or alternatively, multiple similar projections spaced circumferentially and/or axially apart or other rotating mechanisms could be used as would be understood by someone skilled in the art. For example, handle portion 16 may rest on a laterally extending surface of base portion 14 (see FIG. 8). Alternatively, handle portion 16 may be clamped between upper edge 6 of side wall 4, and base portion 14 in a manner e.g. a loose manner, to allow for rotational movement but not translational movement of handle portion 16 with respect to base portion 14 (as seen in FIGS. 11 and 12).

In use, since base portion 14 is fixedly located (e.g. screw threaded) onto the main body 2, and may be locked (albeit temporarily) with respect to main body 2, this relative rotational arrangement of handle portion 16 on base portion 14 enables handle portion 16 of lid 12 (and anything mounted on it or to it) to rotate with respect to base portion 14 and with respect to main body 2.

As can be seen in FIG. 4, two rods 18, here parallel to but spaced apart from a central longitudinal axis AA', are mounted on handle portion 16, and depend downwardly from it when extended into main body 2. Handle portion 16 itself further comprises two spaced apart recesses 18C for receiving respective rods 18 therein. Thus, recesses 18C form, along with rods 18, a telescoping rod structure. Rods 18 may be prevented from removal from recesses 18C by an enlarged proximal (here upper) end 28B retained by a cooperating lip or stop 28A (see FIG. 6A) at a distal (here lower) end of recesses 18C. Nevertheless, rods 18 can move to and fro (axially) within recesses 18C, initially occupying the positions shown by the dotted lines, before being deployed to the extended position, as shown by the solid lines. When handle portion 16 is rotated, rods 18 rotate with it about central longitudinal axis AA'.

A frame 20 is fixedly mounted on the distal end(s) of rods 18. Frame 20 may be any suitable shape but is preferably generally cylindrical. Frame 20 has an outwardly facing second screw thread 25 for cooperating with first screw thread 5 on the inner surface of side wall 4 of main body 2.

Figure 10:
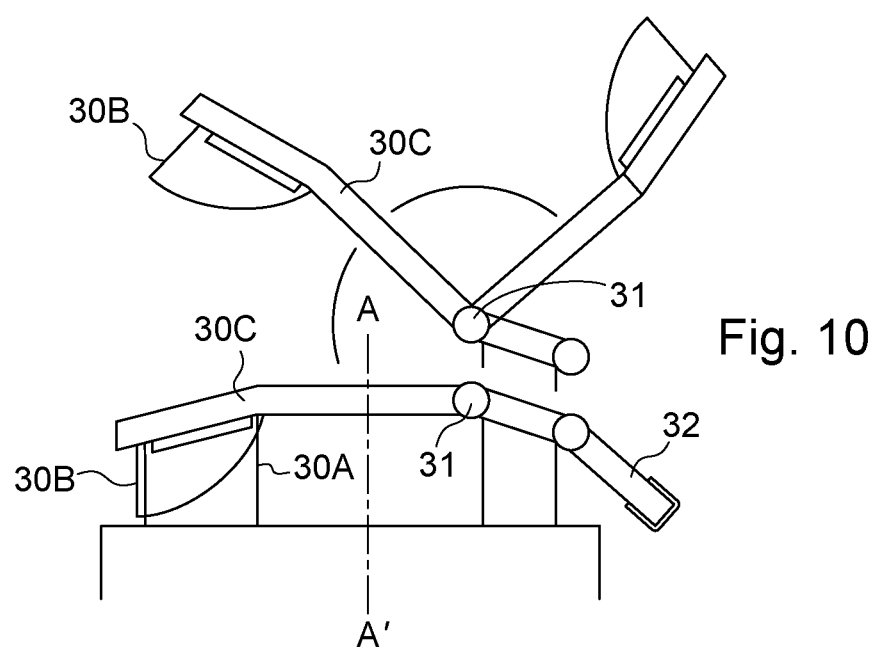
FIG. 10 shows a side elevation view of the lid of FIG. 9.

Lid 12 may comprise a mouthpiece feature 30 (30C in FIG. 10) optionally with a removable (e.g. pivotable) cap (see 30B in FIG. 10). Lid 12 may also comprise an opening (not shown) which may be the mouthpiece or a separate opening with a suitable closure, for receiving liquid and/or solid ingredients (e.g. protein powder, milk powder, fruit pulp, ices, etc).

Typically, however, liquid and powder may be added to volume V of main body 2, when lid 12 is separated from main body 2. Lid 12 is then secured to main body 2 at upper edge 16 via cooperating screw threads 7, 17 (or other openable fixing means, e.g. clip or snap fit mechanism, strong friction fit, etc.).

In FIG. 3, the first screw thread 5 is formed on an inner surface of side wall 4. The first screw thread 5 extends from a position close to but axially spaced apart from upper edge 6 (at a proximal or upper end of main body 2), towards a distal end and the base of main body 2. In this and other embodiments the first screw thread 5 may comprise 'run in' or guide features e.g. in the form of raised inter-engaging slots or screw threads or ridges, as would be understood by those skilled in the art, to facilitate the first screw thread 5 engaging with the second screw thread 25.

In FIG. 4, an alternative arrangement is shown in which screw thread 5 extends axially along the inner surface of side wall 4, both almost to upper edge 6 and further towards the base at the distal end of main body 2. It will be understood that the extent of first screw thread 5 axially along the inner surface of wall 4, determines the extent of travel of frame 20 (and its cooperating screw thread 25) axially to and fro within main body 2. If the main body of FIG. 3 were used, the frame 20 may (when fully retracted) remain somewhat spaced apart from opening 8 and upper edge 6 of main body 2, because screw thread 5 terminates well before upper edge 6. The frame 20 is typically dis-engageable from first screw thread 5 so as to be completely removable from the main body (2) for cleaning etc. However, if the main body 2 of FIG. 7 is used, frame 20 can be retracted to a position immediately adjacent to upper edge 6 (and to opening 8) still located on screw thread 5, e.g. immediately prior to removal of frame 20 from main body 2.

Figure 7:
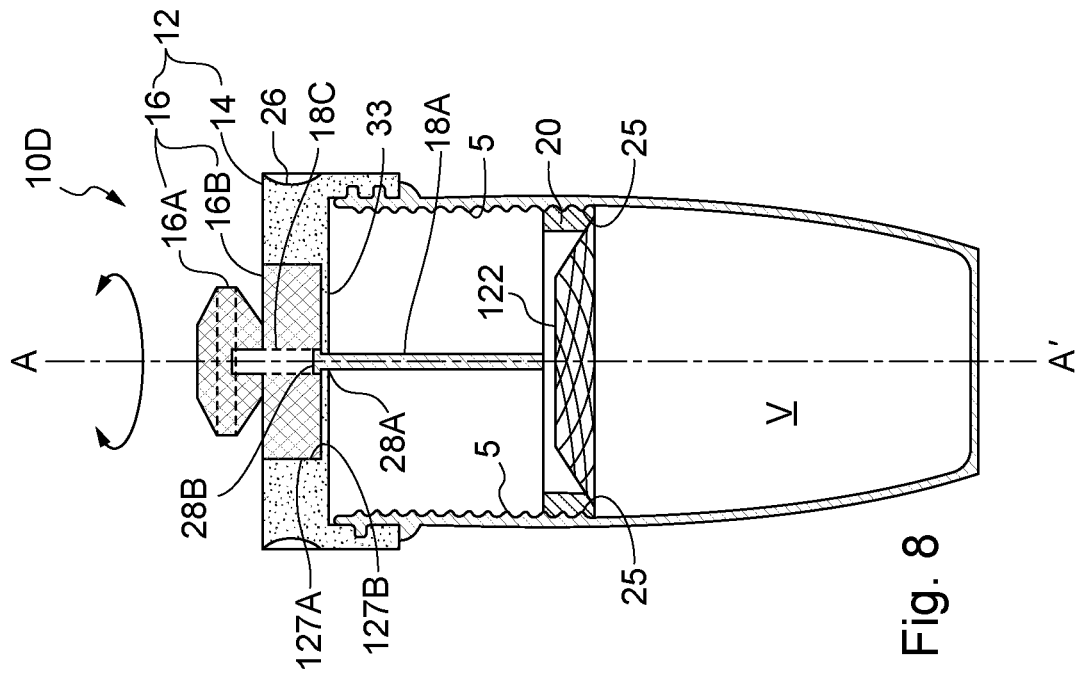
FIG. 7 shows a cross sectional elevation view of a drinks bottle 10C comprising a main body and a lid in a further example embodiment of the invention.

Lid base portion 16 may be provided with an opening or recess 3 (e.g. as shown in FIGS. 4 and 7) for receiving, at least partially, mixing element 22 when in a fully retracted position (i.e. when rods 18 are received within rod recesses 18C).

Base portion 16 has an outer peripheral wall with surface features (here a cylindrical recess 27B) for engaging with corresponding features (here cylindrical protrusion 27A) of base portion 14 to facilitate relative rotational motion. One or more corresponding, interengaging protrusion(s) 27A and recess(es) 27B may be provided on either of the base and/or and handle portions 14, 16. The base and handle portions 14, 16 may initially be clipped together to form lid 12 by virtue of the slight resilience of the material from which these are made, which is typically plastic. Base portion 14 and handle portion 16, together forming lid 12, are fixedly mountable to an upper proximal portion of side wall 4 of main body 2. Indeed, base portion 14 may comprise a temporary or removable locking mechanism to fix it to side wall 4, or vice versa. But, handle portion 16 is rotatable with respect to base portion 14 about a central longitudinal axis AA' of drinks bottle 10B. It can be seen in FIG. 4 that handle portion 16 extends into the internal volume V of main body 2, defining, with a cooperating portion of base portion 14, a cylindrical recess, within which upper edge 6 is received and cooperating screw thread features 7, 17 engage together holding lid 12 tightly to main body 2. Nevertheless, handle portion 16 remains rotatable with respect to base portion 14 and also with respect to main body 2. Gripping features may be provided about an outer surface of handle portion 16, e.g. on a side wall (see gripping features 17, which may be ridges or indents or other surface variations, about handle portion 16 in FIG. 11) and/or as an upwardly extending projection in addition to, or forming part of, mouthpiece 30 (30A).

In use, a user adds ingredients such as liquid, powder, ice, juice, etc. to internal volume V of main body 2 either via opening 8, or via mouthpiece 30, or other opening (not shown). Next, if not already present, lid 12 is screwed onto main body 2 by cooperating screw threads 7, 17. Next, handle portion 16 is rotated with respect to base portion 14. Second screw thread 25 of frame 20 initially rests against and engages with an upper proximal portion of first screw thread 5 on side wall 4 optionally assisted by guide features described above, if present. As handle portion 16 is rotated, frame 20 mounted on rods 18, which are in turn mounted on handle portion 16, also rotates and second screw thread 25 on the outer wall of frame 20 passes over first screw thread 5 of inner side wall 4, causing frame 20 to descend axially towards a central portion of main body 2. Thus, a user's rotation of handle portion 16, causes frame 20 to wind down the inner surface of side wall 4 deploying it into internal volume V. Rods 18 having a distal end fixedly connected to frame 20 are also caused to descend, exiting cooperating rod portions, here in the form of rod recesses 18C. The upper proximal ends of rods 18 are retained within the handle portion 16 by features (e.g. by interengaging lip and stop elements 28A 28B such as those shown in FIG. 6A). Thus, as handle portion 16 continues to rotate, rods 18, frame 20 and mixing element 22 also rotate, and travel axially down side wall 4 of main body 2 on first and second cooperating screw threads 5 and 25, by translational motion in a reciprocal manner. Thus, frame 20 and mixing element 22 can be actively deployed from an initial position adjacent to lid 12 to a more central location within main body 2, when drinks bottle 10 already contains ingredients, and furthermore with the lid 12 already closed. This reduces the risk of spillage. The cooperating first and second screw threads 5 and 25 respectively may have a relatively wide pitch so that a few rotations of handle portion 16 e.g. one, two, or three, can deploy frame 20 to a mixing position within main body 2. Once frame 20 and mixing element 22 are deployed, mixing can take place by agitation of the drinks bottle 10 (10A, 10B, 10C, 10D, 10E) by a user. As drinks bottle 10 is agitated, ingredients within main body 2 pass through pervious mixing element 22 from one side to another and back again. If desired, frame 20 and mixing element 22 can be retracted from a central location to their initial position, once the drink is mixed to a desired extent. These can be redeployed if further mixing or agitation is desired.

The position of the mixing element 22 in frame 20 during agitation may be halfway down main body 2 or indeed any position selected by a user along screw thread 5.

Frame 20 is shown in more detail in FIGS. 5A and 5B. Frame 20 is generally cylindrically shaped, having a cylindrical outer wall on which the second screw thread 25 is formed. Frame 20 may have a generally cylindrical inner central opening 21. Opening 21 may be of a different shape as will be understood by those skilled in the art. Opening 21 may be shaped to accommodate a desired mixing element 22. Mixing element 22 may be two dimensional (2D) for example a flat mesh of metal wire and/or plastic filaments, or may be three dimensional (3D) for example a 3D mesh of metal wire and/or plastic filaments.

Indeed, the mesh itself may be three-dimensional, as shown in FIG. 12. In FIG. 12, a mixing element 22 comprises a rigid mesh of multiple interconnected openings 39 delineated by side walls extending axially with respect to main body 2. The side walls 33 may have an axial height 'h' of a few millimetres e.g. about 2 to about 5 mm.

The cross-section of side walls 33 may be of any suitable shape and may be rectangular having an axial height 'h', lateral width 'w' across the side wall, and lateral depth 'd'. Each side wall 33 therefore has upper and lower edges 37 which are first to engage the contents of the bottle as these pass through the openings 39 in mixing element (here mesh) 22 from top to bottom or vice versa during shaking. These edges may be sharpened to assist in cutting through or breaking up or mixing the contents of the bottle. Thus, one or both of the upper and lower edges 37 of one or more (e.g. every or alternate or some openings 39 or every or alternate or some side walls 33) may have a sharp profile. This sharpened profile of one or more side walls may simply be a narrowing of the upper and/or lower edges 37 to a fraction e.g. 0.5 or 0.25 of the lateral depth 'd' of the side wall, or the side wall itself may be very thin. However, as in the case of FIGS. 11 and 12, the mesh forming the mixing element 22 may be rigid and constructed with sufficient strength to provide the connection between the screw thread of frame 20 and rod 18 which translates the rotational force to frame 20 from handle portion 16.

In FIG. 12, openings 39 are hexagonal and are evenly sized and have even interstitial separations, but these may be of any suitable shape e.g. circular, square, rectangular, pentagonal, octagonal, having one or more side walls of axial height 'h'. Indeed, the axial height may vary from side wall to side wall 33, as indeed may the sharpness of upper and/or lower edges 37. Further the size of the openings 39 and/or their interstitial separations may vary.

Turning back to FIG. 4, here a mixing element 22 of frustoconical shape is shown having a circular cross section, which may match an internal circular cross section of opening 21 formed by the inner wall of frame 20. The internal cross section of opening 21 and periphery of mixing element 22 may be of non-circular cross-section, but of corresponding shapes so there are no minimal or few gaps between an upper part of bottle 10 and a lower part of bottle 10. Alternatively, frame 20 may have elongate thin suspension elements (not shown) such as cross struts for mounting a 3D mixing element more centrally within the frame. Various, replacement mixing elements, and/or mixing frames with various mixing elements, may be provided for replacement if damaged and/or to provide different forms of mixing and/or to provide different whimsical shapes. These may be resistant and/or snap fitted or otherwise located on cooperating features (not shown) as well understood in the art.

Opening 21 is defined by inner wall of frame 20 and may be triangular, square or any other shape, preferably corresponding to a periphery of mixing element 22. Preferably, the outer wall of frame 20 is narrow (in a lateral direction across volume V) and opening 21 extends over a significant portion of the cross section of main body 2 so that a significant portion of the cross section of main body 2 is available for passing liquid, and other ingredients, to and fro, from an upper part to a lower part of main body 2 via mixing element 22, and vice versa, during agitation.

Frame 20 is fixedly connected to a distal end of a rod 18, or rod portion 18B. Rod 18 may be received within a recess 18C, or within a further rod portion 18A, which may itself be received within a further rod portion (not shown), all within a recess 18C. Thus, rods 18 may be formed from a single retractable rod recessed within recess 18C of handle portion 16, or may comprise a series of rod portions 18A, 18B, which optionally may be received within a recess 18C within handle portion 16, or otherwise connected to it. Whilst rod 18 may pass through handle portion 16, rather than be extendable telescopically, this is less preferred. Extendable rod portions 18A, 18B, or indeed rod 18, may be provided with an extendable (e.g. stretchy) polythene sleeve 24 (see FIG. 6B) to reduce exposure to the liquid and other ingredients within the bottle. Sleeve 24 may also or alternatively be of a concertina type construction, as shown, to facilitate expansion. Indeed, in a further variation, sleeve 24 may be dispensed with, and rod portion 18B may be formed from a cage-like structure with multiple large openings to facilitate entry and egress of fluid and easy cleaning. Further variations of this will be apparent to those skilled in the art.

FIG. 7 shows yet a further embodiment in which lid 12 of drinks bottle 10C comprises a base portion 14, and a two-part handle portion 16, rotatable with respect to it. Two-part handle portion 16 comprises lower handle portion 16B, rotatable with respect to base portion 14 by cooperating (here circular) rib 27A and recess 27B. Cooperating ribs and recesses or other structures as would be understood by those skilled in the art, facilitate rotational movement but substantially prevent translational movement of handle portion 16 with respect to base portion 14. One or more ribs and corresponding recesses axially spaced apart may be provided on either or both handle portion 16 and base portion 14.

Thus handle portion 16 comprises on its upper surface an upper handle 16A with gripping features (not shown) which may include levers, or surface features such as ribs or recesses, for facilitating the grip of a user. Handle 16A is fixedly located to lower handle portion 16B which is rotatably mounted with respect to base portion 14. Thus, once lid 12 is securely located on main body 2 via screw threads 7, 17 (as shown), and/or via other fixing features such as clips, snap fit, friction fit, etc. (not shown), handle portion 16 can be rotated with respect to both lid base portion 14 and main body 2 using upper handle portion 16A. Initially, frame 20 is located within opening 3, which opening is formed within handle portion 16, and is (here also) an opening formed within base portion 14 (because base portion 14 does not extend into this opening). Thus, a three dimensional mixing element 22, here a frustoconical shaped mesh, can be located in the recess behind opening 3 within handle portion 16 (and here also within the recess within base portion 14).

Here, rod 18 is provided by two telescoping rod portions 18A and 18B, and a rod portion recess 18C for receiving rod portions 18A and 18B therein (see the dotted lines within recesses 18B). When base portion 14 is located at a proximal (upper) end of main body 2 about edge 6, second screw thread 25 is located on first screw thread 5, which here extends almost to the very top of side wall 4. In use, when handle 16A is rotated, e.g. typically anticlockwise, second screw thread 25 rotates with respect to first screw thread 5 and this relative rotational motion of handle portion 16, with respect to frame 20, results in translational motion of frame 20 and associated mixing element 22 along the central longitudinal axis AA' of drinks bottle 10C and downwards into internal volume V.

Figure 8:
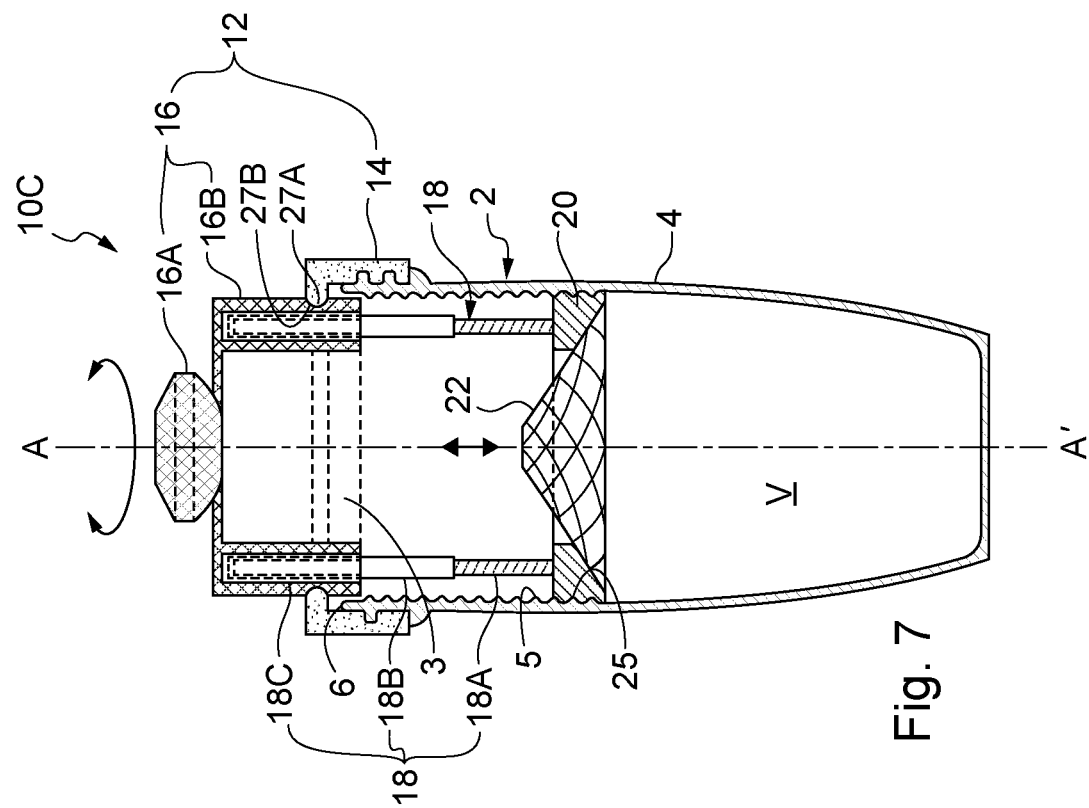
FIG. 8 shows a cross sectional elevation view of a drinks bottle 10D comprising a main body and a lid in yet a further example embodiment of the invention.

In FIG. 8, an alternative drinks bottle 10D, according to the invention, is shown. Here, rod 18 comprises a rod portion 18A, e.g. of longer length, centrally mounted (e.g. along a central longitudinal axis AA') within a rod recess portion 18C within a lower part 16B of handle portion 16. Rod 18A is held within recess 18C by cooperation of protrusion 28B at its proximal end and a lip 28A formed at the terminal edge of a laterally extending shelf 33 of base portion 14. Furthermore, rod 18A comprises one or more interlocking element(s) (e.g. vertical rib(s) and/or recess (es)) (not shown) for cooperating with corresponding interlocking element(s) (e.g. vertical rib(s) and/or recess(es)) (not shown) within rod recess portion 18C, facilitating rotational movement of the rod along with the handle portion when this is rotated, and axial movement of the rod with respect to the handle portion 16 and the main body 2.

Shelf 33 and its associated sidewall 127A form a cylindrical recess (not labelled) for accommodating lower part 16B of handle portion 16 within base portion 14 of lid 12. Thus, base portion 14 comprises a cylindrical recess (formed from shelf 33 and side wall 127A) for accommodating a cylindrical lower part of handle portion 16, so these can rotate with respect to one another. Thus, the outer surface 127B of base portion 16B rests on shelf 33 and rotates on it within the recess (formed from side wall 127A). An intermediate washer member of low friction material or cooperating surfaces of low friction material, may be used to facilitate such rotation.

A mixing element 122 in the form of a curved 3D mesh is mounted within frame 20, preferably extending continuously across the open cross section of main body 2, nominally dividing internal volume V into two parts, an upper part and a lower part, within which liquid and other ingredients can be contained. In example embodiments of the present invention the mixing element 122 can be lowered to approximately half way along the side of the main body 2 of bottle 10, so the upper and lower parts of volume V are roughly equal.

Mixing elements 22, 122 may be interchangeable in frame 20 so that various designs of mixing elements may be provided and used with the same frame 20. Alternatively or in addition various interchangeable frames 20 with differing designs of mixing elements 22, 122 can be used with the same lid 12.

Here, the mixing element 122 is a mesh of curved cross section and of three dimensional (3D) shape. Other variations of shape and cross-sections, such as triangular, circular, square, pentagonal, hexagonal, octagonal etc. are possible, including flat, three dimensional, and/or a variety of whimsical shapes, such as stars, animals, plants, etc. Indeed, whilst it is preferred that mixing element 22, 122, extends entirely across the opening between side wall(s) 4, of main body 2, it need not do so. Indeed a whimsical three dimensional shape may be centrally mounted on cross-beams to frame 20, or on a flat mesh to frame 20.

Figure 9:
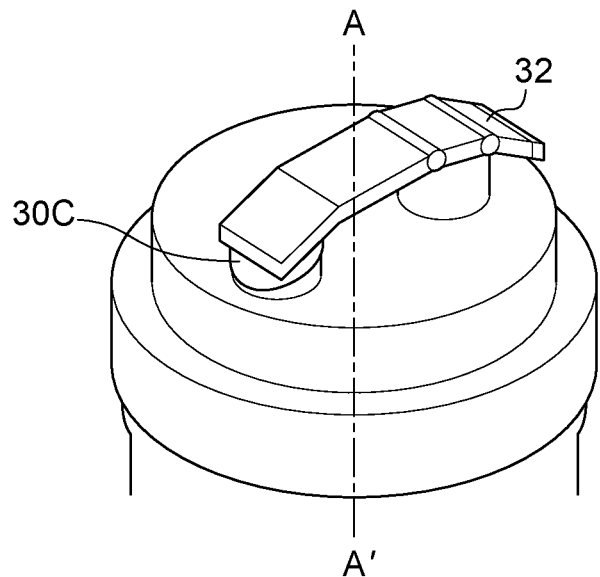
FIG. 9 shows a perspective view from above of a lid of a drinks bottle according to an example embodiment of the invention.

FIGS. 9 and 10 show a mouthpiece 30A, covered by a cap 30B, mounted on a lever 30C, about a pivot 31. Lever 30C can be retracted about pivot 31 to expose mouthpiece 30A. Optionally, a carry handle 32, such as a carabiner may be provided.

FIGS. 11 and 12 show a further embodiment of a drinks bottle 10E having a mixing frame 20 and mixing element 22 of rigid curved (here toroidal) construction formed of interengaging side walls 33 arranged to form a multiplicity of hexagonal openings 31. These resemble a honeycomb. Each side wall 33 has an axial height 'h', lateral width 'w' in one lateral direction and lateral depth 'd' in the mutually orthogonal lateral direction as shown in FIG. 12 and described earlier. In this embodiment, these dimensions are all the same for each opening 39, (here each cell), although these may be different. One or more upper and lower edges 37 of side walls 33 may be sharp as described elsewhere e.g. narrower than their depth 'd', or simply thin-walled to facilitate cutting and mixing.

Preferably, the mesh of mixing element 22 is sufficiently rigid by means of its structure (e.g. a honeycomb structure) and/or its material to sit within frame 20 and rotate frame 20 when it is itself rotated by means of a (here centrally located) rod 18A.

In this example embodiment, an upper rod portion 18B is fixedly located on handle portion 16 by inter-engaging screw threads, but other fixing means such as welding or unitary construction and so on are feasible. Expandable concertinaed sleeve 24 is optional. Indeed, rod portion 18B may be of an open cage structure to facilitate fluid ingress and egress and cleaning. Rod portions 18A and 18B are in telescoping relation to each other and can move to and from axially but are otherwise fixed with respect to each other e.g. by means of one or more slots and a spigot type arrangement. This means that, upon rotation of handle portion 16, rod portions 18B and 18A rotate causing mixing element 22 (rigidly fixed to a lower end of rod portion 18A) to rotate so causing frame 20 to rotate on first screw thread 5 and move to and fro on first screw thread 5, deploying or retracting mixing frame 20 and its mixing element 22.

Variations of the invention will be apparent to those skilled in the art upon reading this disclosure. For example, the screw threads (7, 17, 5, 25) may be continuous screw threads but need not be. These may be formed of discontinuous features arranged to form interengaging screw threads. The rotatable features (27A, 27B, 127A, 127B) may be continuous features but need not be, e.g. these may be discontinuous features arranged to form interengaging rotatable features.

The mixing element such as a mixing mesh, or geometrical shape, or whimsical shape, may be of any suitable shape or construction as understood on reading this disclosure. Further these may be detachable for cleaning and/or replacement.

2 main body
4 side wall
5 first screw thread
6 upper edge
7 screw thread
8 opening
10, (10A, 10B, 100, 10D) drinks bottles
12 lid
14 base portion
16A upper handle portion
16B lower handle portion
18 (18A, 18B) rod or rod portion, 18C rod recess
20 frame
21 central opening in frame
22, 122 mixing element
24 extendable sleeve
25 second screw thread
26 grip features on handle portion
27A, 27B, 127A, 127B interengaging rotational features
28A stop
28B rod enlarged head
30 mouthpiece and pivotable cap structure
30A mouthpiece (drinking spout)
30B mouthpiece cap
30C lever 31 pivot
32 handle e.g. carabiner chip on handle
33 side wall of mesh opening
37 upper and lower edges of side wall 33
39 mesh opening (a cell)

The invention claimed is:

1. A drinks bottle comprising:
   a main body for containing liquid, the main body having at least one side wall terminating, at a proximal end, in an upper edge defining an opening, an inner surface of the side wall comprising a first screw thread extending along the side wall away from the upper edge towards a distal end of the main body;
   a removable lid closing the opening, the removable lid comprising:
     a base portion removably located at the upper edge of the main body;
     a handle portion rotatable with respect to the base portion;
     at least one rod mounted on the handle portion rotatable with the handle portion;
     depending from a distal end of the at least one rod, a frame having a side wall, an outer surface of the side wall comprising a second screw thread for engaging with the first screw thread on the inner surface of the side wall of the main body;
     a mixing element mounted on the frame;
   whereby, in use, rotating the handle portion with respect to the base portion rotates the at least one rod and frame, engaging the first and second screw threads, and causing the frame and mixing element to travel within the main body towards a distal end of the main body.

2. A drinks bottle according to claim 1 in which the at least one rod comprises at least two telescoping rod portions with a distal end of a first rod portion fixed to, or fixable to, the frame and a proximal end of a second rod portion fixed to, or fixable to, or forming part of, the handle portion of the lid.

3. A drinks bottle according to claim 1 in which the at least one rod is provided fixed to, or fixable to, or rigidly fixed to, or rigidly fixable to, or forming part of, the handle portion, optionally at, or associated with and/or about, a central location of the handle portion.

4. A drinks bottle according to claim 1 in which wherein the at least one rod comprises at least two rods provided evenly spaced about, and/or from, a central longitudinal axis of the drinks bottle.

5. A drinks bottle according to claim 1 in which, at a distal end, the base portion of the lid comprises at least one opening for the at least one rod to pass into the main body.

6. A drinks bottle according to claim 1 in which the base portion and handle portion of the lid comprise respective interengaging rotatable surface features to facilitate relative rotational motion therebetween.

7. A drinks bottle according to claim 6 in which the interengaging surface features on each of the base portion and handle portion comprise one or more of:
   a) corresponding protrusion(s) and recess(es);
   b) corresponding cylindrical features and recess(es) for receiving same;
   c) ball bearings;
   d) one or more low friction surface.

8. A drinks bottle according to claim 1 in which the handle portion is located within an external periphery of the base portion in a lateral direction.

9. A drinks bottle according to claim 1 in which the handle portion of the lid extends above and/or below the base portion of the lid in an axial direction.

10. A drinks bottle according to claim 1 in which the handle portion and/or the base portion comprise a recess, or respective recessed portions, for receiving at least a portion of the mixing element and, optionally, the frame, when these are in a retracted position.

11. A drinks bottle according to claim 1 in which the frame is generally, or substantially, cylindrical.

12. A drinks bottle according to claim 1 in which the second screw thread on the side wall of the frame comprises at least one of:
   at least one pitch of the screw thread, more than one pitch of the screw thread, more than one and half pitches of the screw thread, or more than two pitches of the screw thread.

13. A drinks bottle according to claim 1 in which the mixing element is three-dimensional.

14. A drinks bottle according to claim 1 in which the mixing element comprises, or is made of, one or more of:
   a) one or more removable, and/or replaceable, sub-elements;
   b) an open structure to allow liquid and powder to pass through it;
   c) relatively stiff construction;
   d) rigid construction;
   e) mesh comprising multiple openings;
   f) wire;
   g) any suitable material.

15. A drinks bottle according to claim 1 in which the mixing element comprises a rigid mesh with multiple openings defined by rigid side walls extending in an axial direction.

16. A drinks bottle according to claim 15 in which at least part of an upper and/or lower edge of at least one side wall of at least one opening is provided with a sharp edge.

17. A drinks bottle according to claim 14 in which a mesh comprising multiple openings is provided and the multiple openings vary in a lateral dimension.

18. A drinks bottle according to claim 1 in which the at least one rod comprises an open structure to facilitate entry and exit of contents of the bottle.

19. A method of mixing ingredients using the drinks bottle according to claim 1 comprising:
   adding ingredients e.g. a liquid and a powder, to the main body;
   affixing the base portion of the lid to the upper edge of the main body;
   rotating the handle portion of the lid with respect to the base portion causing the first and second screw threads to engage deploying the frame and mixing element into the main body of the drinks bottle; and
   agitating the drinks bottle thereby mixing the ingredients using the mixing element.

20. A method according to claim 19 comprising:
   rotating the handle portion of the lid with respect to the base portion in the opposite direction causing the first and second screw threads to engage in an opposite direction, retracting the frame and the mixing element, optionally into the lid.

21. A drinks bottle according to claim 1 in which the at least one rod is axially moveable with respect to the handle portion.

22. A drinks bottle according to claim 1 in which the first screw thread comprises at least one pitch.

23. A drinks bottle comprising:
   a main body for containing liquid, the main body having at least one side wall terminating, at a proximal end, in an upper edge defining an opening, an inner surface of the side wall comprising a first screw thread extending along the side wall away from the upper edge towards a distal end of the main body;

a removable lid closing the opening, the removable lid comprising:

a base portion removably located at the upper edge of the main body;

a handle portion rotatable with respect to the base portion;

at least one rod mounted on the handle portion rotatable with the handle portion; and axially moveable with respect to the handle portion;

depending from a distal end of the at least one rod, a frame having a side wall, an outer surface of the side wall comprising a second screw thread for engaging with the first screw thread on the inner surface of the side wall of the main body;

a mixing element mounted on the frame;

whereby, in use, rotating the handle portion with respect to the base portion rotates the at least one rod and frame, engaging the first and second screw threads, and causing the at least one rod, frame and mixing element to travel within main body towards a distal end of main body.

* * * * *